United States Patent [19]

Jackson

[11] Patent Number: 4,643,358
[45] Date of Patent: Feb. 17, 1987

[54] BOOM MOUNTING ASSEMBLY

[76] Inventor: Raymond Jackson, P.O. Box 6547, Vero Beach, Fla. 32961

[21] Appl. No.: 730,303

[22] Filed: May 3, 1985

[51] Int. Cl.⁴ .............................................. B05B 1/20
[52] U.S. Cl. .................................... 239/166; 52/120; 172/456; 172/459; 172/463
[58] Field of Search ............... 239/164, 165, 166–168; 52/120, 111; 172/459, 463, 476, 456, 126–132, 311

[56] References Cited

U.S. PATENT DOCUMENTS

| | | | |
|---|---|---|---|
| 2,995,307 | 8/1961 | McMahon | 239/166 |
| 3,055,594 | 9/1962 | Nansel | 239/167 |
| 3,581,993 | 6/1971 | Reams | 239/168 |
| 4,063,597 | 12/1977 | Day | 172/459 |
| 4,315,602 | 2/1982 | Kubacak et al. | 239/165 |
| 4,466,491 | 8/1984 | Tower | 172/459 |

FOREIGN PATENT DOCUMENTS

| | | | |
|---|---|---|---|
| 930769 | 7/1973 | Canada | 239/167 |
| 24253 | 11/1962 | German Democratic Rep. | 239/164 |

Primary Examiner—Joseph F. Peters, Jr.
Assistant Examiner—Michael J. Forman
Attorney, Agent, or Firm—Carroll F. Palmer

[57] ABSTRACT

A mechanism for adjusting the height and level of a movable boom is disclosed. This mechanism includes a carrier member mountable for vertical pivotal movement about one end thereof, and a first actuator is provided for controlling the movement and position of the carrier member. A unitary member for supporting the boom in a cantilevered manner is also provided. The unitary support member is connected at the distal end of the carrier member for vertical pivotal movement. Finally, a second actuator is provided for controlling the vertical movement of the support member and boom relative to the carrier member, with the second actuator controlling the vertical level of the boom and the first actuator controlling the vertical height of the boom.

13 Claims, 15 Drawing Figures

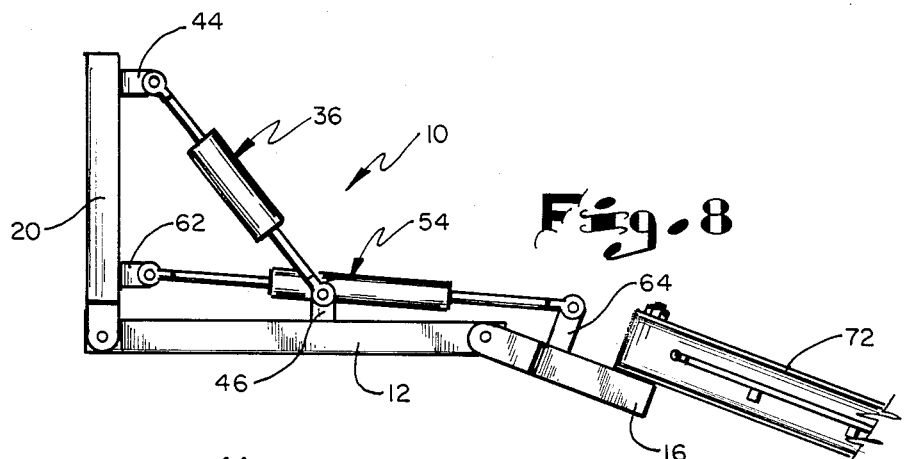
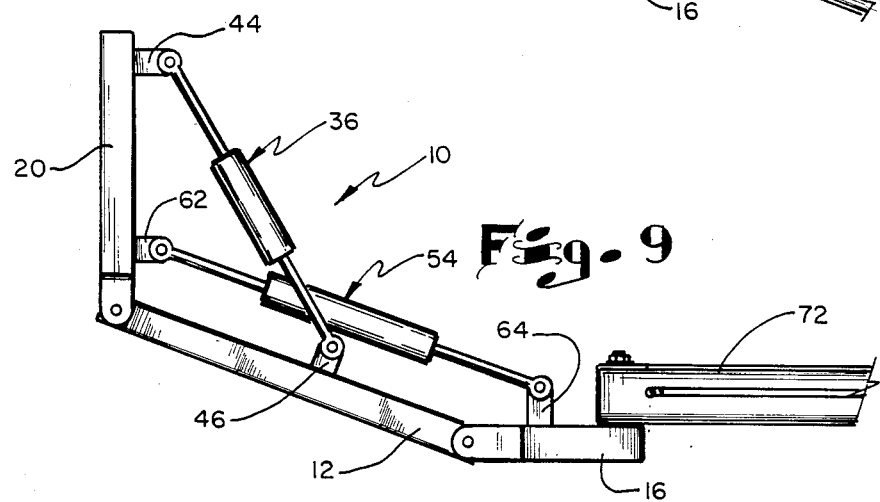
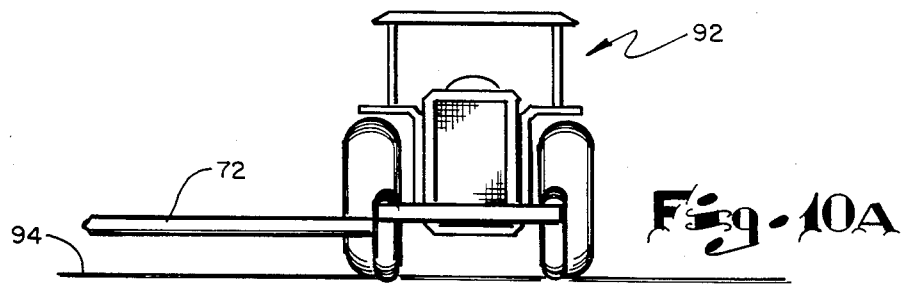

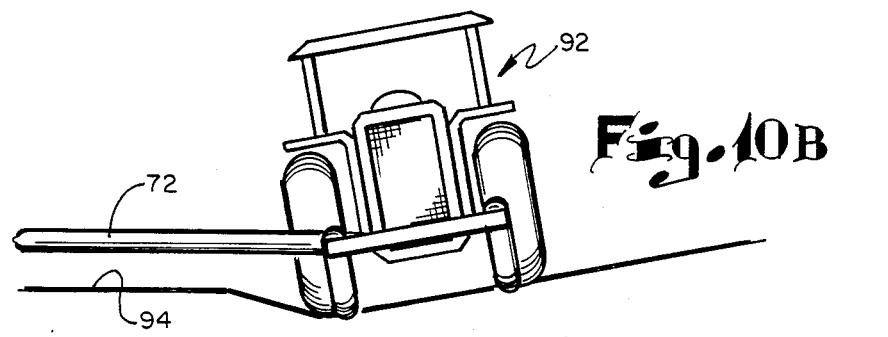
Fig. 10B
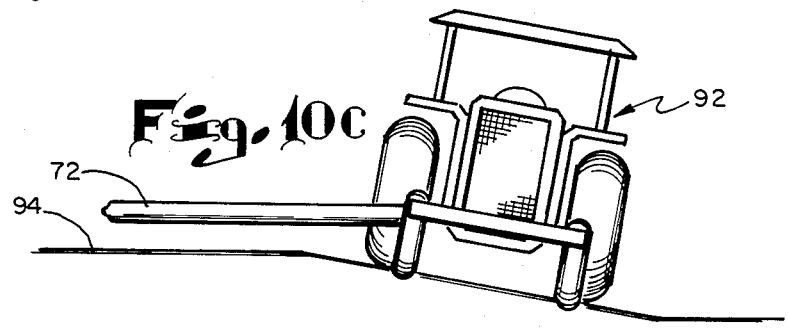
Fig. 10C
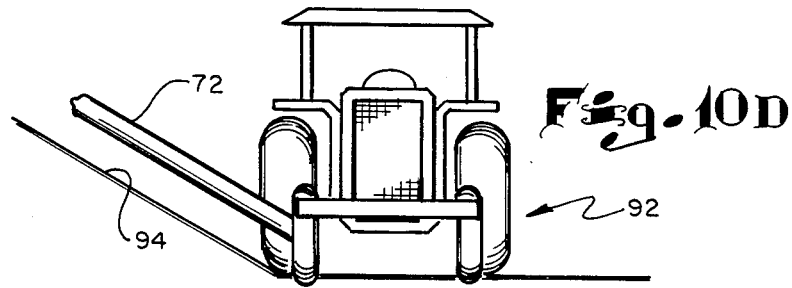
Fig. 10D
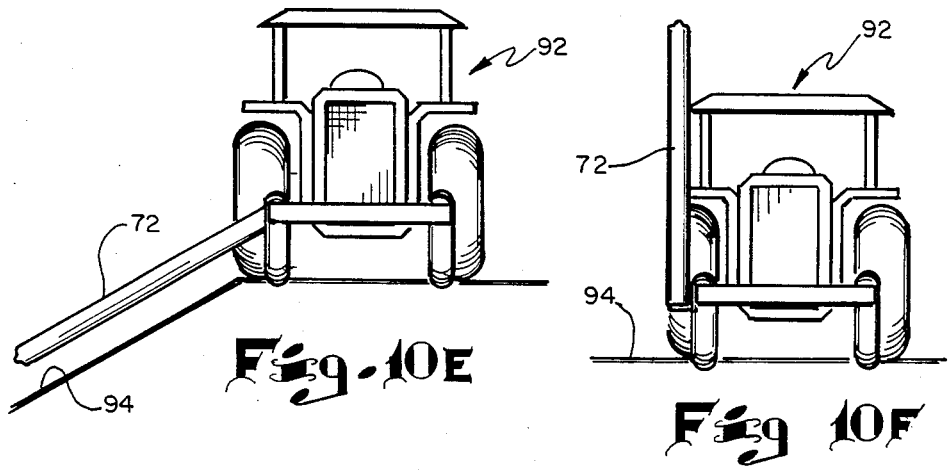
Fig. 10E
Fig. 10F

BOOM MOUNTING ASSEMBLY

BACKGROUND OF THE INVENTION

1. Field of The Invention

This invention relates generally to boom assemblies mountable to tractors and the like and, more particularly, to improved boom assembly mechanisms for agricultural uses such as in the application of herbicides. Specifically, the present invention relates to an improved mounting mechanism which permits ready adjustment of the height and level of a movable boom assembly.

2. Description of The Prior Art

Boom assemblies mountable to tractors, trucks or other moving vehicles are very common. Such assemblies have been used for a multitude of agricultural purposes including, for example, herbicide applications, seed planting, certain crop harvesting and the like. Such boom assemblies have a variety of requirements depending upon the purpose for which the assembly is used as well as the type of crops or plants involved in such use.

Regardless of the particular use involved, however, such boom assemblies must be adjustable with respect to their height above the ground. Many prior art designs incorporate a variety of simple mechanical devices for effecting such height adjustments. In those instances where the ground remains substantially level and the crop height is basically uniform, such manual mechanical adjustment features are very adequate. However, in those instances where the crop heights vary considerably, height adjustment of the boom assembly must be done relatively frequently, and prior mechanical arrangements for effecting such adjustments become very cumbersome. Moreover, when the ground does not remain particularly level, the angle of the boom relative to the tractor, i.e., the level of the boom, must also be adjustable in addition to the overall height of the boom above the ground. When such level adjustments must be done frequently, manual mechanical devices for making such adjustments are, again, cumbersome and time consuming.

When boom assemblies are mounted to tractors for herbicidal application, many demanding operational requirements arise. This is particularly true where the herbicide application involves fruit tree crops, especially citrus growth with bedded groves. In such instances, frequent adjustment in the boom height and/or level become necessary. Prior art mechanical arrangements to effect such adjustments are consequently inadequate.

One prior boom assembly design attempted to overcome the above problems by incorporating a multipiece boom support member. This multipiece boom support member was in turn carried by a support arm projecting from the side of a tractor. This multipiece boom support member had been devised in an attempt to permit easy change of the boom level relative to the horizontal plane of the tractor. However, such an arrangement did not work and was unable to maintain the position of the boom at the desired angle.

Thus, there remains a need for an adjustable boom assembly wherein both the height and the angle of level are readily adjustable by a tractor operator. This need is particularly evident when such boom assemblies are used as herbicide applicators in citrus growth and the like.

SUMMARY OF THE INVENTION

Accordingly, it is one object of the present invention to provide an improved boom assembly adapted for mounting to a tractor or the like.

It is another object of the present invention to provide an improved herbicide applicator.

It is yet another object of the present invention to provide a mechanism for independently adjusting the height and the level of angle of a movable boom assembly without having to interrupt operations utilizing the boom.

It is still another object of the present invention to provide a herbicide applicator boom arrangement mountable to the side of a tractor wherein the height and the level of the boom may be independently and frequently adjusted without having to cease herbicide application.

To achieve the foregoing and other objects and in accordance with the purpose of the present invention, a mechanism for adjusting the height and level of a movable boom is provided. The mechanism includes a carrier member mountable for vertical pivotal movement about one end thereof. A first actuator device controls the movement and position of the carrier member. A unitary member is provided for supporting the boom in a cantilevered manner. The unitary support member is connected to the distal end of the carrier member for vertical pivotal movement relative to the carrier member. A second actuator is also provided for controlling the vertical movement of the support member and boom relative to the carrier member. The second actuator controls the level of the boom, and the first actuator controls the vertical height of the boom.

BRIEF DESCRIPTION OF THE DRAWINGS

The features of the present invention which are believed to be novel are set forth with particularly in the appended claims. The invention, together with further objects and advantages thereof, may best be understood by reference to the following description taken in conjunction with the accompanying drawings and which:

FIG. 8 is another view of the mechanism of FIG. 6 but illustrating the boom and support member pivoted to an angular position below the horizontal;

FIG. 9 is yet another view of the mechanism illustrated in FIG. 6 but showing the carrier arm pivoted at an angle below the horizontal with the boom and support arm remaining at a substantially level position relative to the ground surface;

FIG. 10A-10F are schematic views of a tractor carrying a herbicidal boom assembly constructed in accordance with the present invention and illustrating various positions that the boom assembly may be readily moved to relative to the tractor position and ground surface contour.

DETAILED DESCRIPTION OF THE PREFERRED EMBODIMENTS

Figure 1:
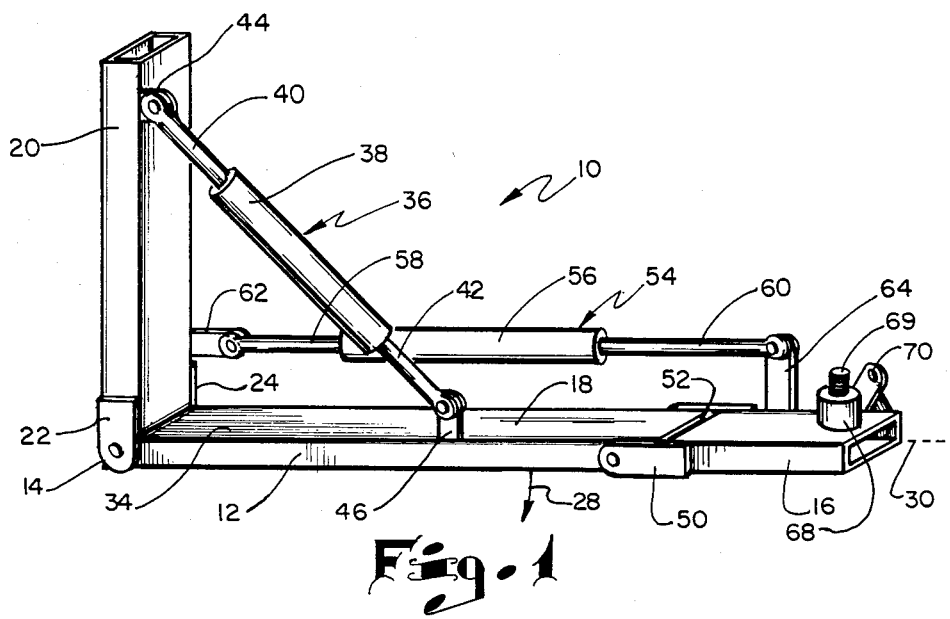
FIG. 1 is a rear perspective view of a boom mounting mechanism constructed in accordance with the present invention.
Figure 2:
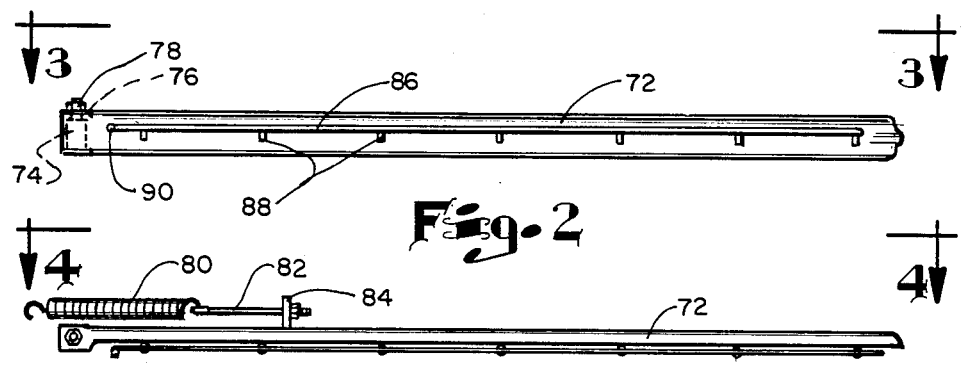
FIG. 2 is a rear view of a boom attachable to the mechanism illustrated in FIG. 1 and incorporating a herbicide application mechanism therein.
Figure 3:
FIG. 3 is a plan view of the boom illustrated in FIG. 2 and taken substantially along line 3—3 of FIG. 2.
Figure 4:
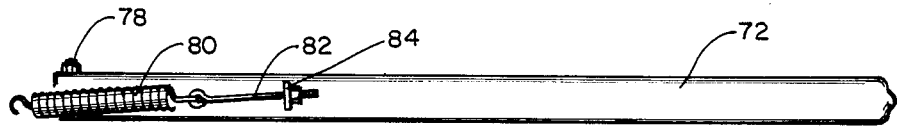
FIG. 4 is a front elevation view of the boom illustrated in FIG. 2 and taken substantial along line 4—4 of FIG. 3.
Figure 5:
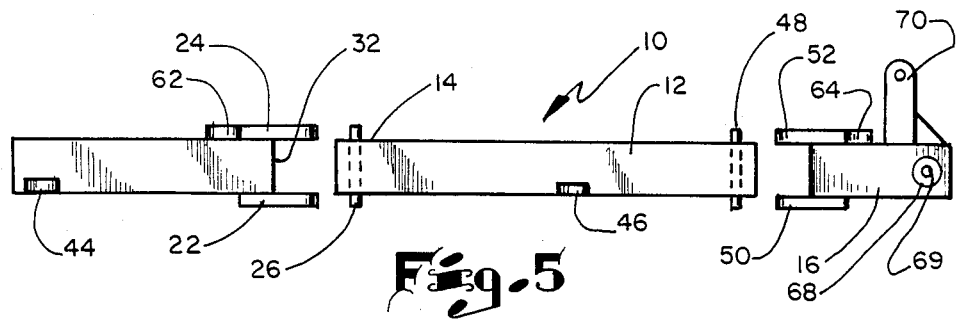
FIG. 5 is a top plan view of a portion of the mechanism illustrated in FIG. 1 showing some of the major parts thereof diassembled and laid flat.
Figure 6:
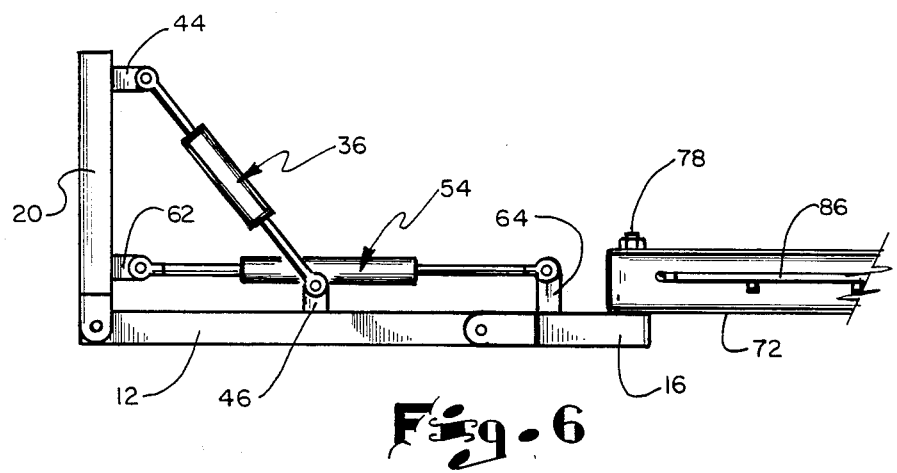
FIG. 6 is a rear view of the mechanism illustrated in FIG. 1 and illustrating a boom as shown in FIG. 2 secured thereto.

Referring now to the figures and more particularly to FIGS. 1 and 5, a mechanism for mounting and readily adjusting the height and the angle of level of a movable boom is disclosed. The mounting mechanism 10 includes a carrier member 12 which is adapted for mounting at one end 14 for pivotal movement through a substantially vertical plane. The mechanism 10 also includes a boom support member 16 mounted on the distal end 18 of the carrier member 12. The support member 16 is likewise mounted for pivotal movement about the end 18.

The carrier member 12 is preferably constructed from steel or any other suitable high strength material. While the carrier member 12 may be formed in any desired shape, the preferred structure is a box-like tubular member. Likewise, the remaining structural components of the mechanism 10 as described in detail below are also preferably constructed from the same material and in the same form as the carrier member 12.

In preferred form, the inner or proximate end 14 of the carrier member 12 is mounted to a base member 20 so as to achieve the aforementioned pivotal movement. The base member 20 is generally an elongated member oriented in a vertical fashion and is mounted to the side of a tractor or the like by any conventional attachment mechanism. The base member 20 also includes a pair of depending ears 22, 24 which are adapted for engagement with a pivot pin 26 mounted in the proximate end 14 of the carrier member 12. In this manner, the carrier member 12 may be afforded limited movement in a vertical plane about the pivot pin 26. The movement of the carrier member 12 is generally in the direction indicated by the arrow 28. Preferably the member 12 can move through at least 45° below the horizontal as represented by the horizontal axis 30 of the carrier member 12.

A first actuator 36 is provided for controlling the movement of the carrier member 12 as indicated by the arrow 28. Moreover, once the carrier 12 has reached the desired position relative to the base member 20, the first actuator 36 maintains that position of the carrier member 12. Although any desired driving arrangement may be utilized with the invention, an hydraulic cylinder 38 is preferred. It will be noted that the member 12 may be stopped in the horizontal position by the hydraulic cylinder 38. When the cylinder 38 is completely withdrawn, member 12 will be stopped in the horizontal position. The hydraulic cylinder 38 is preferably a dual action cylinder having end posts 40, 42 mounted to brackets 44 on the base member 20 and 46 on the carrier member 12. In an alternate form of the present invention, the bracket 44 may be mounted directly to the side of the tractor without including a separate base member 20. In such event, the arrangement of the pin 26 and the ears 22, 24 would be slightly different than as illustrated. The control lever (not illustrated) for the hydraulic cylinder 38 may be located in any desired position and is preferably located within the cab of a tractor to which the mechanism 10 is mounted.

Figure 7:
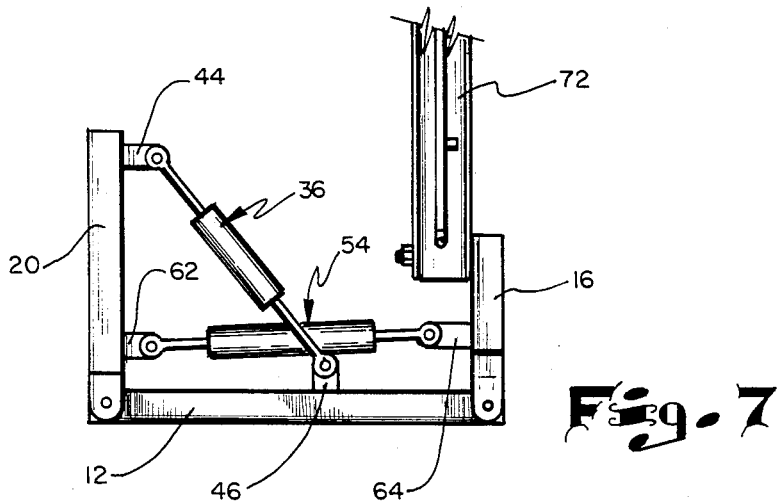
FIG. 7 is a view substantially similar to that of FIG. 6 but illustrating the boom and support member in an upright position pivoted 90° above the horizontal.

As previously indicated, a boom support member 16 is pivotably mounted to the distal end 18 of the carrier member 12. In preferred form, the distal end 18 includes a pivot pin 48 disposed therein, while the boom support 16 includes a pair of ears 50, 52 which are adapted for engagement with the pivot pin 48. The hinge arrangement as illustrated by the ears 50, 52 and the pivot pin 48 permit upward pivotal movement of the boom support 16 about the pin 48 through a vertical plane at least 90° above the horizontal as represented by the axis 30 in FIG. 1. This particular movement is illustrated in FIG. 7. Likewise, the hinging arrangement permits movement of the boom support 16 downwardly below the horizontal at least 45° as illustrated by FIG. 8. In this manner, the boom support 16 may move at least 135° to provide substantial angular change in the level of the boom (see below).

A second actuator 54 is preferably provided for effecting the above described movement of the boom support 16. In preferred form, the second actuator is identical in construction to the preferred first actuator and includes a dual action cylinder drive mechanism 56 having end posts 58, 60 mounted, respectively, to brackets 62, 64. The bracket 62 is preferably secure to the base member 20 in a position vertically lower than that of the bracket 44, while the bracket 64 is mounted to the boom support member 68. The bracket 62, 64 are arranged such that the longitudinal axis of the second actuator 54 is preferably substantially parallel to the axis of the carrier member 12 and boom support 16 when the boom support 16 is axially aligned with the carrier member 12, as illustrated in FIG. 1. Moreover, the height of the brackets 62, 64 above the carrier member 12 is sufficient so as to permit at least a 45 degree downward pivotal movement below the horizontal by the support member 16. Should the bracket 64 be too short, the post 60 will engage the end 18 of the carrier member 12 before the boom support member 16 has been pivoted downward a full 45°.

A boom mounting pivot 68 and a return spring lever 70 are mounted to the distal end of the boom support member 16. The mounting pivot 68 is used to securely mount the boom (see below) to the boom support member 16 yet allow movement of the boom in a substantially horizontal direction. Likewise, the return lever 70 functions in conjunction with other components to urge the boom back into an aligned position with the boom support member 16 as further described below.

Referring now to FIGS. 2-4 and 6, a boom 72 is provided for mounting to the boom support member 16. With respect to movement of the boom support member 16 within the vertical plane, the boom 72 moves as a fixed extension of the boom support 16. In a preferred form, the boom 72 includes a large aperture 74 disposed in one end thereof for receiving the mounting pivot 68. Likewise, a smaller aperture 76 is provided for receiving the threaded post 69 atop the mounting pivot 68. A nut 78 or other conventional attachment device is used to firmly secure the boom 72 to the mounting pivot 68. Thus, the boom 72 is free to pivot about the mounting pivot 68 in a substantially horizontal plane but is not free to move separate or apart from the support member 16 in a vertical plane.

A return spring 80 is preferably provided and is interconnected by a breakaway bolt 82 to a bracket 84 disposed on the front side of the boom 72. Likewise, the return spring 80 is secured to the return spring lever 70 disposed on the boom support member 16. In this manner, if the boom 72 comes into contact with any fixed items during operation of the boom and tractor as described below, the boom 72 will be free to rotate about the pivot 68 in the horizontal plane so as not to damage the mechanism 10 or the boom 72. Once the obstruction has been removed from the boom 72, the return spring 80 urges the boom 72 back into an aligned position coaxially with the boom support member 16. Thus, the return spring 80 tends to maintain the boom 72 in an aligned position absent an outside force moving the boom 72 out of position.

As previously indicated, one preferred embodiment of the present invention occurs when the boom mechanism of the present invention is utilized as part of a herbicide applicator. In this form of the invention, the boom 72 carries a conduit 86 disposed along the length of the boom 72. Positioned intermittently along the conduit 86 are a plurality of nozzles 88 which are directed downwardly toward the ground surface and are adapted to deliver herbicide to the ground surface. The conduit 86 is preferably provided along the rear surface of the boom 72 so as not to be damaged by contact with any objects while the boom 72 is moved forwardly during spray operation. A flexible conduit (not illustrated) interconnects the innermost end 90 of the conduit 86 to a source of herbicide generally contained on the tractor which carries the mechanism 10 itself.

Referring, now, more particularly to FIGS. 6-9, the operation of the present invention is readily disclosed therein. As previously discussed, the first actuator 36 is adapted for controlling the limited pivotal movement of the carrier member 12 within the vertical plane as well as maintaining the position of the carrier member 12 once the member 12 has been moved into the desired position. As can be particularly seen in FIG. 9, movement of the first actuator 36 will raise or lower the height of the boom 72 secured to the mechanism 10. The placement of the carrier member 12, the placement of the brackets 44, 46, and the capability to move the carrier 12 a full 45° below the horizontal, all permit a horizontal boom height adjustment from ground level to about 20 inches above the ground when the base member 20 is mounted to the side of a tractor or the like.

Likewise, as previously indicated, the actuator 54 controls the movement of the boom support member 16 through a full 135° as well as maintains the position of the support member 16 when the desired position is achieved. Some examples of the various positions achievable are specifically illustrated in FIGS. 6-9. For example, in FIG. 6 the carrier member 12 and boom support 16 are coaxially aligned approximately 90° to the base 20. This causes the boom to be level across level ground and at its maximum height above the ground. In FIG. 7, the support member 16 has been moved upwardly a full 90° above the horizontal so as to place the boom 72 in position for transportation. FIG. 8 illustrates the carrier member 12 in a substantially horizontal position 90° to the base 20 while the boom support member 16 has been moved below the horizontal so as to adjust the level of the boom 72 to irregular ground falling away from the tractor carrying the base 20. In FIG. 9, the carrier member 12 has been moved below the horizontal, and the boom support member 16 has been moved above the horizontal relative to the carrier member 12 so as to maintain the boom 72 at a level position above substantially level ground similar to FIG. 6. However, in FIG. 9 the height of the boom 72 above the ground surface is substantially less than that indicated and illustrated in FIG. 6. As can be seen and readily visualized, a myriad of combinations of movements between the carrier member 12 and the boom support 16 can be provided for any changing ground or crop condition. Since the first and second actuators 36, 54 are independently controlled and are easily actuated, both the height and the level of the boom 72 may be modified quickly by the operator simply by manipulation of the controls leading to the actuators 36 and 54.

FIGS. 10A-10F more graphically illustrate the height and level adjustment capabilities of the boom 72 afforded by the mechanism 10 as previously discussed relative to FIGS. 6-9. In FIG. 10, a tractor 92 is shown. While not specifically illustrated, the base member 20 of the mechanism 10 is mounted to the side of the tractor 92 such that the boom 72 projects outwardly from the side of the tractor 92. In FIG. 10A, the boom 72 projects horizontally outwardly above a level ground surface 94, a condition also illustrated in FIG. 6. In FIG. 10E, the boom 72 is directed angularly downwardly from the tractor 92 due to the ground surface 94 dropping away from the tractor 92, a condition also illustrated in FIG. 8. The opposite of this condition is illustrated in FIG. 10D where the ground surface 94 angles upwardly away from the tractor 92. This requires the boom 72 to be angled upwardly relative to the horizontal so as to maintain the boom 72 substantially level to the ground surface 94.

In FIGS. 10B and 10C, the ground surface beneath the tractor 92 has shifted so as to require adjustment of the boom 72 to maintain it substantially level across substantially level ground while the tractor 92 is, itself, not level. Finally, FIG. 10F illustrates a condition also illustrated in FIG. 7 wherein the boom 72 has been moved to an upwardly projecting position for travel, i.e., 90° above the horizontal.

As can be seen from the above detailed descriptions, the present invention offers a number of improvements to boom mounting mechanisms, and particularly when the boom assemblies are utilized in herbicidal spray applications. The present invention permits easy and immediate hydraulic leveling and height control of the boom. Moreover, the present invention provides boom breakaway with automatic return should the boom come into contact with any obstacles while the tractor, which is carrying the boom, is moving. Also, the boom itself is preferably cantilevered and does not require any boom support wheel as is typical in many prior art designs.

In the herbicidal spray embodiment, nozzle tips connected to the boom do not need to extend below the boom and therefore prevents damage to the nozzle tips. Moreover, the spray pattern of the herbicide applicator is readily viewable to the operator of a tractor if the mechanism 10 is mounted forward of the tractor cab. Such ease of operation and adjustment of boom level and height are very important in many applications, and in particular in agricultural applications for herbicidal spray. All of the aforementioned advantages, however, are achieved without any expensive machinery components and complicated mechanisms. Thus, the boom mechanism of the present invention is not only more versatile and easier to operate, but is also inexpensive to construct and easy to mount.

It will be understood that the invention may be embodied in other specific forms without departing from the spriritr or central characteristics thereof. The present examples and embodiments, therefore, are to be considered in all respects as illustrative and not restrictive, and the invention is not to be limited to the details given herein but may be modified within the scope of the appended claims.

I claim:

1. A mechanism for supporting a boom laterally of a vehicle while permitting said boom to be moved by controls carried on said vehicle to set its position at varied angles relative to the horizontal and also to alter its vertical height without having such height variation movement substantially effect said relative horizontal position setting which comprises:
   a verticl base member having an upper portion, a lower portion and a first longitudinal web extending therebetween,
   carrier means having a first proximal end, a first distal end and a second longitudinal web extending therebetween, said carrier means being mounted at said first proximal end on said support member for vertical pivotal movement about a first horizontal axis laterally of said support member,
   support means having a second proximal end, a second distal end and a third longitudinal web extending therebetween, said support means being connected by said second proximal end to said first distal end for vertical pivotal movement about a second horizontal axis,
   means on said second distal end by which to mount a boom thereon,
   a first actuator unit means for controlling the pivotal movement of said carrier means having a first inboard end, a first outboard end and rigid, variable length means connecting said first inboard end to said first outboard end,
   a second actuator unit means for controlling the pivotal movement of said support means having a second inboard end, a second outboard end and rigid, variable length means connecting said second inboard end to said second outboard end,
   said first inboard end being mounted for pivotal movement to said first longitudinal web adjacent said upper portion,
   said first outboard end being mounted for pivotal movement to said second longitudinal web,
   said second inboard end being mounted for pivotal movement to said first longitudinal web adjacent said lower portion, and
   said second outboard end being mounted for pivotal movement to said third longitudinal web.

2. The mechanism of claim 1 wherein said first actuator unit means comprises a double action hydraulic cylinder.

3. The mechanism of claim 2 wherein said second actuator unit means comprises a double action hydraulic cylinder.

4. The mechanism of claim 1 wherein said second inboard end and said second outboard end mountings comprise lateral brackets.

5. The mechanism of claim 1 wherein a boom is cantilevered on said support means by a mounting pivot to permit horizontal movement of said boom.

6. The mechanism of claim 5 having means associated with said support means and said boom for aligning said boom with said support means and for returning said boom to such aligned position when said boom has been pivoted out of said aligned position by engagement with an obstruction in its path of travel.

7. The mechanism of claim 1 wherein said vertical base member is a metal base adapted for mounting on a vehicle.

8. The mechanism of claim 7 wherein said metal base is a section of rectanglar tubing having an upper end and a lower end, a pair of ears are fixed to said lower end and said carrier means pivots at said first proximal end on a pin extending through said ears.

9. The mechanism of claim 1 wherein said vertical base member is a portion of a vehicle upon which said mechanism is mounted.

10. A herbicial applicator comprising the mechanism of claim 1,
    a boom carried on said support means to pivot horizonatally thereon, and
    means carried by said boom for applying herbicide therefrom.

11. The applicator of claim 10 wherein said boom is cantilevered on said support means.

12. The applicator of claim 11 wherein said boom includes spring return means adapted to maintain said boom in axial alignment with said support means and to return said boom to its aligned position after said boom has been pivotably moved out of said aligned position.

13. A herbicial applicator comprising:
    a mechanism for supporting a boom laterally of a vehicle while permitting said boom to be moved by controls carried on said vehicle to set its position at varied angles relative to the horizontal and also to alter its vertical height without having such height variation movement substantially affect said relative horizontal position setting which comprises:
    a vertical base member having an upper portion, a lower portion and a first longitudinal web extending therebetween,
    carrier means having a first proximal end, a first distal end and a second longitudinal web extending therebetween, said carrier means being mounted at said first proximal end on said support member for vertical pivotal movement about a first horizontal axis laterally of said support member,
    support means having a second proximal end, a second distal end and a third longitudinal web extending therebetween, said support means being connected by said second proximal end to said first distal end for vertical pivotal movement about a second horizontal axis,
    means on said second distal end by which to mount a boom thereon,
    a first actuator unit means for controlling the pivotal movement of said carrier means having a first inboard end, a first outboard end and rigid, variable length means connecting said first inboard end to said first outboard end,
    a second actuator unit means for controlling the pivotal movement of said support means having a second inboard end, a second outboard end and rigid, variable length means connecting said second inboard end to said second outboard end,
    said first inboard end being mounted for pivotal movement to said first longitudinal web adjacent said upper portion, said first outboard end being mounted for pivotal movement to said second longitudinal web, said second inboard end being mounted for pivotal movement to said first longitudinal web adjacent said lower portion, said second outboard end being mounted for pivotal movement to said third longitudinal web, a boom cantilevered on said support means to pivot horizonatally thereon, means carried by said boom for applying herbicide therefrom, and spring return means adapted to maintain said boom in axial alignment with said support means and to return said boom to its aligned position after said boom has been pivotably moved out of said aligned position.

* * * * *